United States Patent
Farrell et al.

(10) Patent No.: US 10,033,583 B2
(45) Date of Patent: Jul. 24, 2018

(54) ACCELERATING DEVICE, CONNECTION AND SERVICE DISCOVERY

(71) Applicant: INTERNATIONAL BUSINESS MACHINES CORPORATION, Armonk, NY (US)

(72) Inventors: Craig A. Farrell, San Diego, CA (US); Daniel J. Martin, Pawling, NY (US); Piyush Sarwal, Leawood, KS (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/258,262

(22) Filed: Apr. 22, 2014

(65) Prior Publication Data

US 2015/0304167 A1    Oct. 22, 2015

(51) Int. Cl.
 *G06F 15/177* (2006.01)
 *H04L 12/24* (2006.01)

(52) U.S. Cl.
 CPC ........ *H04L 41/0816* (2013.01); *H04L 41/085* (2013.01)

(58) Field of Classification Search
 CPC .. H04L 41/0816; H04L 41/0866; H04L 67/32
 USPC ................. 709/221, 223; 370/331; 726/1, 4
 See application file for complete search history.

(56) References Cited

U.S. PATENT DOCUMENTS

| | | | |
|---|---|---|---|
| 7,293,077 B1 * | 11/2007 | Teo | 709/221 |
| 7,616,594 B2 | 11/2009 | Roberts et al. | |
| 7,664,125 B1 * | 2/2010 | Bauer | H04L 41/0233 370/408 |
| 8,495,255 B2 | 7/2013 | Butler et al. | |
| 2001/0011348 A1 * | 8/2001 | Blumenau | G06F 9/4411 713/100 |
| 2003/0016655 A1 * | 1/2003 | Gwon | H04L 45/00 370/352 |
| 2003/0149756 A1 * | 8/2003 | Grieve | H04L 41/0869 709/223 |
| 2003/0154268 A1 * | 8/2003 | Sato | H04L 29/12009 709/223 |
| 2008/0304408 A1 | 12/2008 | Kraemer et al. | |
| 2009/0083406 A1 * | 3/2009 | Harrington | G06F 15/16 709/222 |
| 2010/0158026 A1 * | 6/2010 | Valmikam | H04L 12/5602 370/401 |
| 2011/0280213 A1 * | 11/2011 | Calhoun | H04W 76/022 370/331 |

(Continued)

*Primary Examiner* — Thuong Nguyen
(74) *Attorney, Agent, or Firm* — Scully, Scott, Murphy & Presser, P.C.; Scott Dobson, Esq.

(57) ABSTRACT

There are provided a system, a method and a computer program product for managing one or more network devices. The one or more network devices are connected indirectly or directly to one or more networks and communicate each other by exchanging one or more messages. A classifier intercepts the one or more messages associated with one or more network devices. The classifier classifies each of the intercepted messages into a layer. A discovery system receives the each classified message and detecting, based on the each received classified message, a new network device added to the one or more networks and detecting one or more configuration changes made on the one or more network devices.

19 Claims, 9 Drawing Sheets

(56) References Cited

U.S. PATENT DOCUMENTS

2015/0156183 A1\* 6/2015 Beyer .................... H04L 63/08
726/4
2015/0304355 A1\* 10/2015 Voit ....................... H04L 63/20
726/1

\* cited by examiner

ACCELERATING DEVICE, CONNECTION AND SERVICE DISCOVERY

BACKGROUND

This disclosure relates generally to managing one or more network devices, and particularly to detecting a new network device and detecting one or more changes made on network devices.

BACKGROUND OF THE INVENTION

With a growth of server virtualization (i.e., partitioning a physical server into multiple virtual servers), it takes a month or more to buy a new server, to install the new server, to load an operating system on the new server, and to load an application on the new server. It takes a plurality of minutes to create a virtual machine (i.e., a virtual server) on an existing computer. Once installed, a server device may operate for months or years. Companies (e.g., Netflix, etc.) utilize virtual machines at maximum capacities in order to match daily and hourly requirements from customers. Those companies continuously use resources of virtual and physical servers in order to meet the requirements.

SUMMARY

There are provided a system, a method and a computer program product for managing one or more network devices. The one or more network devices are connected indirectly or directly to one or more networks and communicate each other by exchanging one or more messages. A classifier intercepts the one or more messages associated with one or more network devices. The classifier classifies each of the intercepted messages into a layer. A discovery system receives the each classified message and detects, based on the each received classified message, a new network device added to the one or more networks and detects one or more configuration changes made on the one or more network devices.

In order to detect the new network device and to detect the configuration changes made on the one or more network devices, the discovery system parses the each received classified message. The discovery system fits, based on the parsing, the each received classified message to a message group among a plurality of message groups. The plurality of message groups includes: a message group associated with messages for adding the new network device into the one or more networks and a message group associated with messages for modifying configurations of the one or more network devices.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 3:
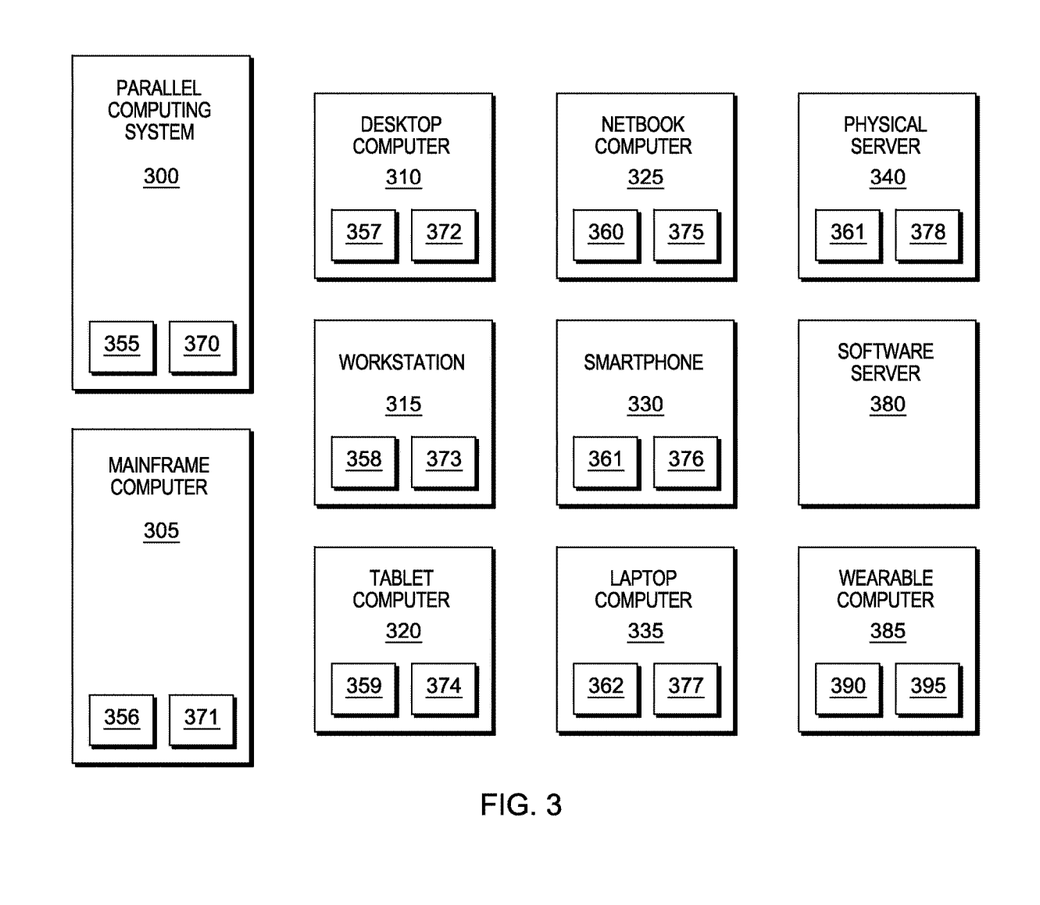
FIG. 3 illustrates exemplary hardware configurations for performing method steps shown in FIGS. 1-2B in one embodiment.
Figure 8:
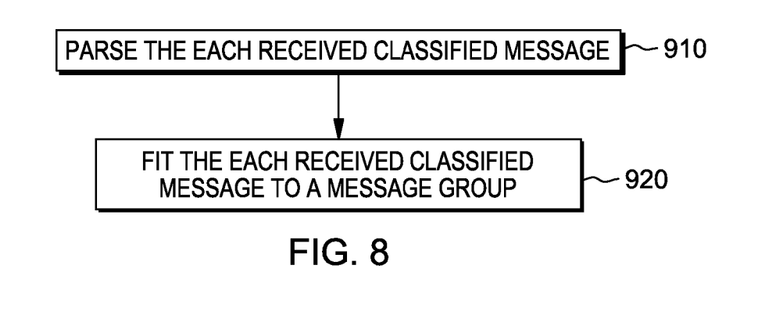
FIG. 8 illustrates a flowchart that describes method steps for detecting a new network device and/or configuration changes made on an existing network device(s) in one embodiment.

In one aspect, a discovery system (i.e., a system running method steps shown in FIG. 8) is listening for specific messages (e.g., a coldStart trap running under Simple Network Management Protocol (SNMP)—a message that indicates re-initialization and configuration change(s) of a network device, etc.). A service creation system, a provisioning system, and/or an activation system create one or more streams of data that exquisitely describe every single change or addition to one or more networks. The service creation system refers to herein a computing system that provides one or more services, for example, a server device hosting an Internet domain. The provisioning system refers to herein a computing system that manages a network in order to provide a service via that network. The activation system refers to herein a computing system that initiates other computing systems to operate. FIG. 3, which is described below, illustrates examples of those computing systems.

Those streams of data come from one or more the computing platforms, e.g., a network of server devices, virtual machines, data storage devices, and network connections between server devices (or virtual machines) as any change to those computing platforms is made, e.g., via a message (for example, the coldStart trap described above). In one embodiment, the discovery system does not monitor a communication port and/or a communication path of a computing platform in order to detect an addition of a new network device to a network and/or detect configuration changes made on existing network device(s). The discovery system does not echo (i.e., does not send an acknowledgement to) log entries made by receiving one or more messages (e.g., the coldStart trap, etc.) from all the computing platforms. Rather, the discovery system detects the addition of the network device and/or the configuration changes, e.g., by running method steps shown in FIGS. 1 and 8. In another embodiment, the discovery system monitors the communication port and/or echoes the log entries in order to detect the addition of the new network device and/or the configuration changes. For example, a communication port of the discovery system may receive a message whose header indicates a new mail server whose web address is not listed on a list of current existing network device stored in the discovery system.

In one embodiment, the discovery system discovers the addition of the new network device or the configuration changes through analyzing of configuration messages (or configuration files) as the configuration messages (or configuration files) are being run (i.e., processed) in the discovery system and/or a network device associated with the configuration messages (or the configuration files). In one embodiment, an analysis of a configuration message includes performing steps shown in FIG. 8, which is described in detail below. The discovery system verifies the configuration changes and the addition of the new network device, e.g., by querying a MIB (Management Information Bases—database used for managing network devices in communication networks) associated with the new network device and/or the configuration messages (or the configuration files) or by querying the configuration messages (or configuration files), e.g., by using a command which may be used to query a file in the network device or the discovery system. In one embodiment, this command may include, but is not limited to: a RPM (Red Hat® Package Manager) command and a command similar to the RPM command. In another embodiment, the discovery system initiates a discovery process upon receiving and processing a (classified) message, written in a machine readable code—binary code, about the addition of the new network device and/or the configuration changes. The discovery process includes, but is not limited to: (1) querying the MIB(s); and (2) parsing that message, etc. Parsing refers to herein processing natural or computer languages according to a pre-determined grammar or rule.

Figure 1:
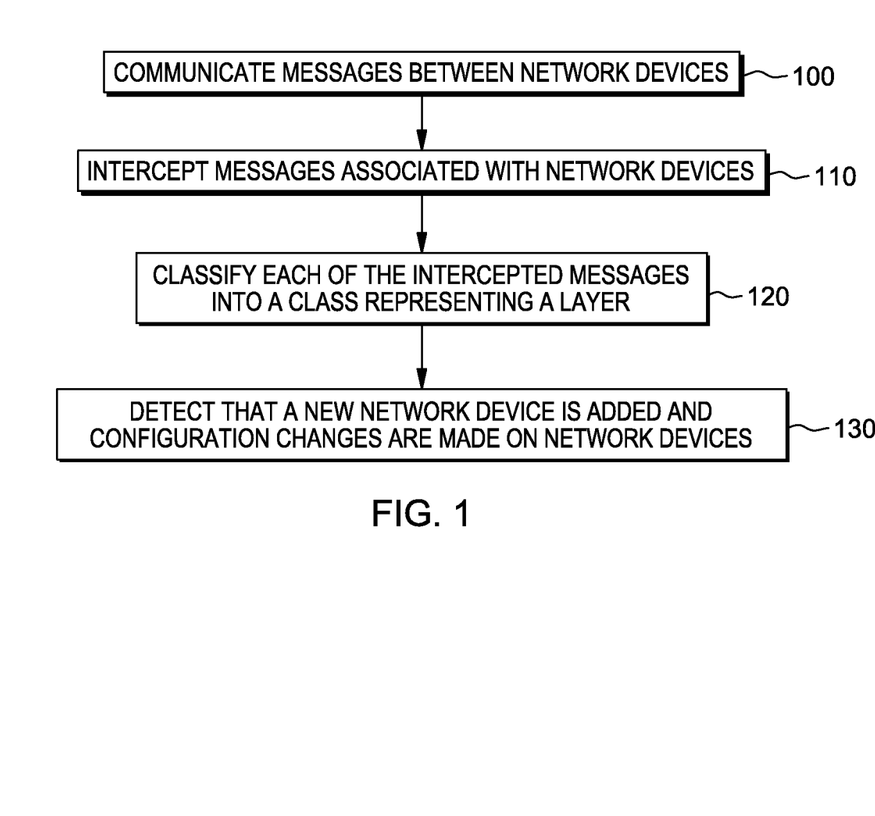
FIG. 1 illustrates a flowchart that describes method steps for managing one or more network devices in one embodiment.
Figure 5:
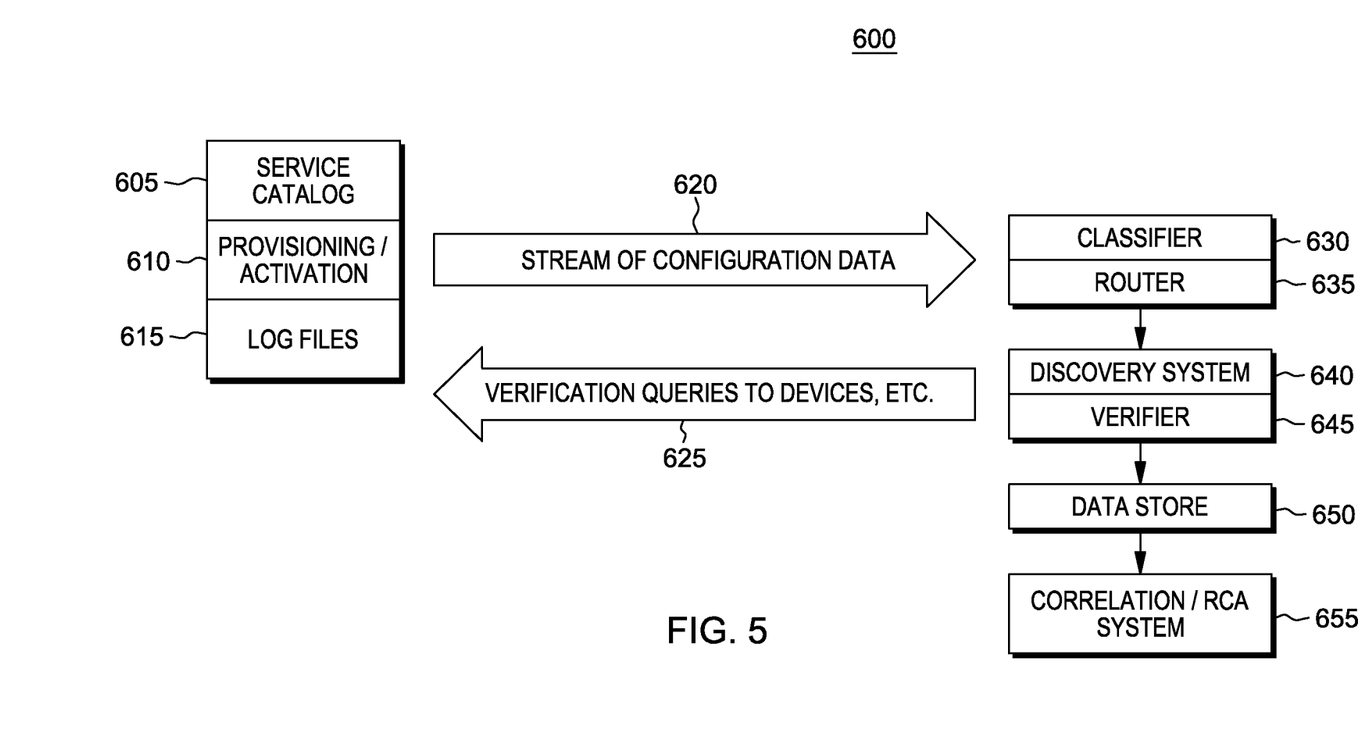
FIG. 5 illustrates a system diagram for managing one or more network devices in one embodiment.
Figure 6:
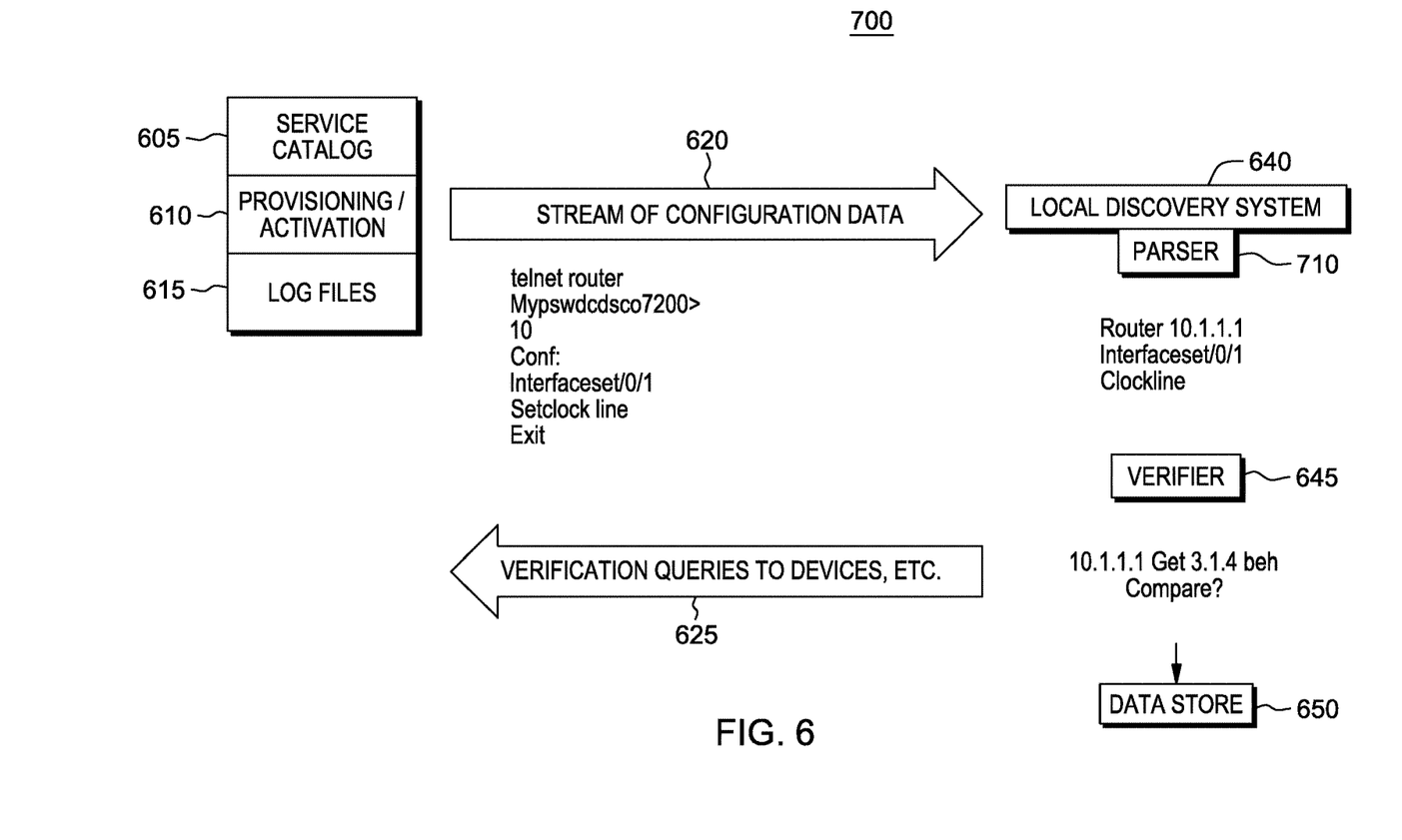
FIG. 6 illustrates a system diagram for managing one or more network devices in another embodiment.
Figure 7:
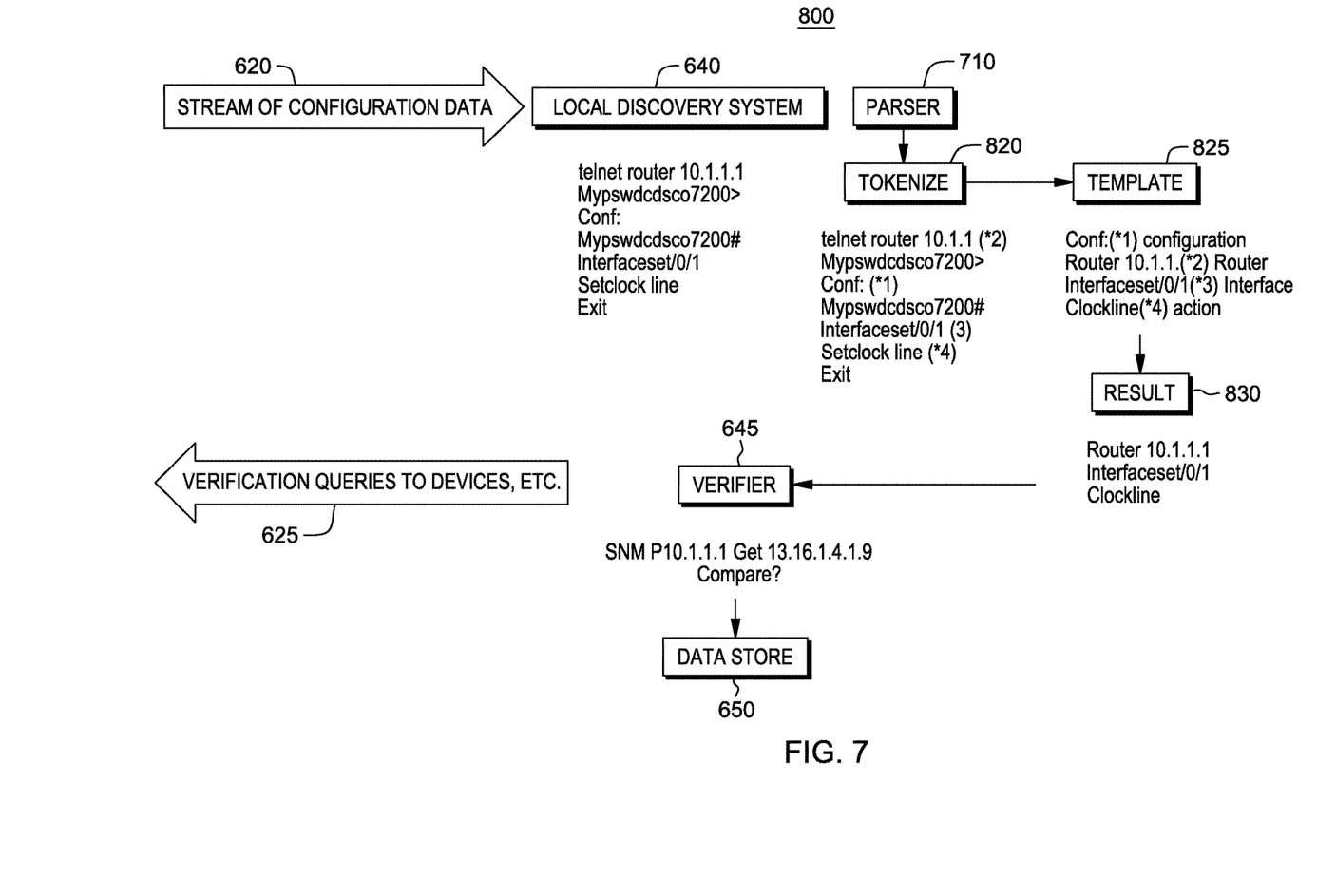
FIG. 7 illustrates a system diagram for managing one or more network devices in another embodiment.

FIG. 1 illustrates a flowchart that describes method steps for managing one or more network devices. FIG. 5 illustrates a system diagram 600 for managing the one or more network devices in one embodiment. FIG. 6 illustrates a detailed system diagram 700 for discovering a new network device and/or a configuration change(s) made on an existing network device in a detailed embodiment. FIG. 7 illustrates another detailed system diagram 800 for managing the one or more devices in a detailed embodiment. The one or more network devices are connected indirectly or directly to one or more communication networks. A network device includes, but are not limited to: (1) a server device connected to the one or more networks; (2) a virtual machine running on the server device; (3) a data storage device connected to the server device; (4) one or more communication paths in the one or more networks; (5) a router; (6) a network switch; (7) a service provided by the server device or the virtual machine; (8) an optical computer or optical computer equipment, which use photons (instead of electronic current) to perform computing; and (9) a load balancer, etc.

At 100 in FIG. 1, the one or more network devices communicate each other, e.g., by exchanging one or more messages 620 shown in FIGS. 5-7. The one or more messages include, but are not limited to: (1) one or more configuration messages associated with the one or more network devices; (2) one or more configuration files associated with the one or more network devices; (3) the coldStart trap message that reinitializes a corresponding network device and notifies to an element management system (EMS) that configuration of the corresponding network device is altered (the EMS, for example, which may include a Cisco® ASR 5000 Element Management System, is a system or a tool that manages network devices); (4) a warmStart trap running under Simple Network Management Protocol (SNMP) that reinitializes a corresponding network device and notifies the EMS that configuration of the corresponding network device is not altered; (5) one or more messages that indicates a creation of one or more virtual machines on the one or more network devices; (6) log files (e.g., log files 615 shown in FIGS. 5-6) echoed from the one or more network devices; (7) service catalogs (e.g., a service catalog 605 shown in FIGS. 5-6) associated with the one or more network devices (a service catalog refers to herein a list of services provided by an organization associated with the network devices); and (8) one or more commands that activate or deactivate the one or more network devices, etc. In one embodiment, the one or more network devices and/or the computing system write the one or more messages, e.g., by using a machine readable code—binary code.

Configuration changes on existing network devices are made in a number of ways, which include but are not limited to: (1) by modifying a service catalog(s), (2) by provisioning and activation systems (e.g., a provision/activation system 610 shown in FIGS. 5-6) which may alter a network device connected to a network to provide a new service, (3) by a function call(s) (e.g., a function call that initiates the coldStart trap) to the element management system(s) from an orchestration system(s) (i.e., an automated system that arranges, coordinates and/or manages computing systems, middleware and/or services), then transmitting a message(s) from the element management system(s) to a corresponding network device(s); and (4) by commands, e.g., a command that modifies a configuration file(s), automatically entered by the existing network devices, etc.

Returning to FIG. 1, at 110, a classifier (e.g., a classifier 630 shown in FIG. 5) intercepts the one or more messages associated with the one or more network devices, e.g., by using Microsoft® MessageInterceptor class objects that monitors messages. The classifier may receive the one or more messages. The classifier may receive the log files echoed from the one or more network devices or the service catalogs.

The classifier intercepts a data stream of service and resource configurations associated the one or more network devices, e.g., a known mediation device that is used for lawfully intercepting a communication network data traffic. The EMS may transmit a command, e.g., Windows® "regedit" command for editing a software application registry, for changing a configuration to the one or more network devices, e.g., via the one or more networks (not shown). After receiving the transmitted command, the one or more network devices run the transmitted command.

In one embodiment, the EMS that may manage the service catalogs may not send any message to a corresponding network device(s) though a new service (e.g., a new application installation that can provide a new service to customers, etc.) has been added to the corresponding network device(s). The EMS may receive a transaction log file(s) which are echoed (i.e., sent) from the corresponding network device upon that the addition of the new service to the corresponding network device. The classifier monitors (or intercepts) a data traffic to or from the corresponding network device. The data traffic may include the one or more messages associated with the corresponding network device. In one embodiment, the classifier does not monitor liveness of the corresponding network device, e.g., by not sending any command to the corresponding network device. In another embodiment, the classifier monitors liveness of the corresponding network device, e.g., by periodically sending the ping command to the corresponding network device.

Returning to FIG. 1, at 120, the classifier identifies one or more classes associated with the one or more networks and the one or more network devices. The classifier classifies each of the intercepted messages into a class that represents a layer which is described in detail below. In one embodiment, a class corresponds to a layer. An identified layer (i.e., an identified class) includes, but is not limited to: (1) a layer corresponding to an operating system of the one or more network devices; (2) a layer corresponding to a physical link in the one or more networks; (3) a layer corresponding to each of the one or more networks; (4) a layer corresponding to a layer in TCP/IP model that is used to implement the one or more networks to which the one or more network devices are connected; and (4) a layer corresponding to each of the one or more networks; and (4) a layer in OSI (Open Systems Interconnection) seven layer model that is used to implement the one or more networks to which the one or more network devices are connected, etc. For example, the classifier may classify an intercepted message to a layer, e.g., based on an operating system that a network device, which sent the intercepted message, uses.

In another embodiment, a class corresponds to a state in a finite state machine. In this embodiment, the finite state machine represents an operation of a corresponding network device. A state in this finite state machine represents a message group of the one or more messages. For example, there may exist a state that corresponds to the coldStart trap. Each message group may affect the operation of the corresponding network device, e.g., by changing a configuration(s) of the corresponding network device or by changing a service(s) provided from the corresponding network device. For example, the classifier may classify the warmStart trap message to a class that represents the warmStart trap.

In another embodiment, a class corresponds to each content subject of the one or more messages. By running a content analysis tool, the classifier classifies each message to one or more message groups, each of which represents a content subject. For example, a content subject may indicate that a network device can provide a corresponding service via a software application installed on that network device. In one embodiment, a combination of a parser (e.g., a parser 710 shown in FIGS. 6-7), a tool that tokenizes or partitions the each message (e.g., tokenizer 820 shown in FIG. 7) and a tool (e.g., template 825 shown in FIG. 7) that fits the each message to a message group represents a content subject. For example, if the content analysis tool of the classifier determines that a current message that the classifier intercepts is a continuation of a previous message sent by a same sender to a same recipient about a same thing, then the classifier may determine that the current message and the previous message belong a same class (i.e., a same message group).

Figure 2A:
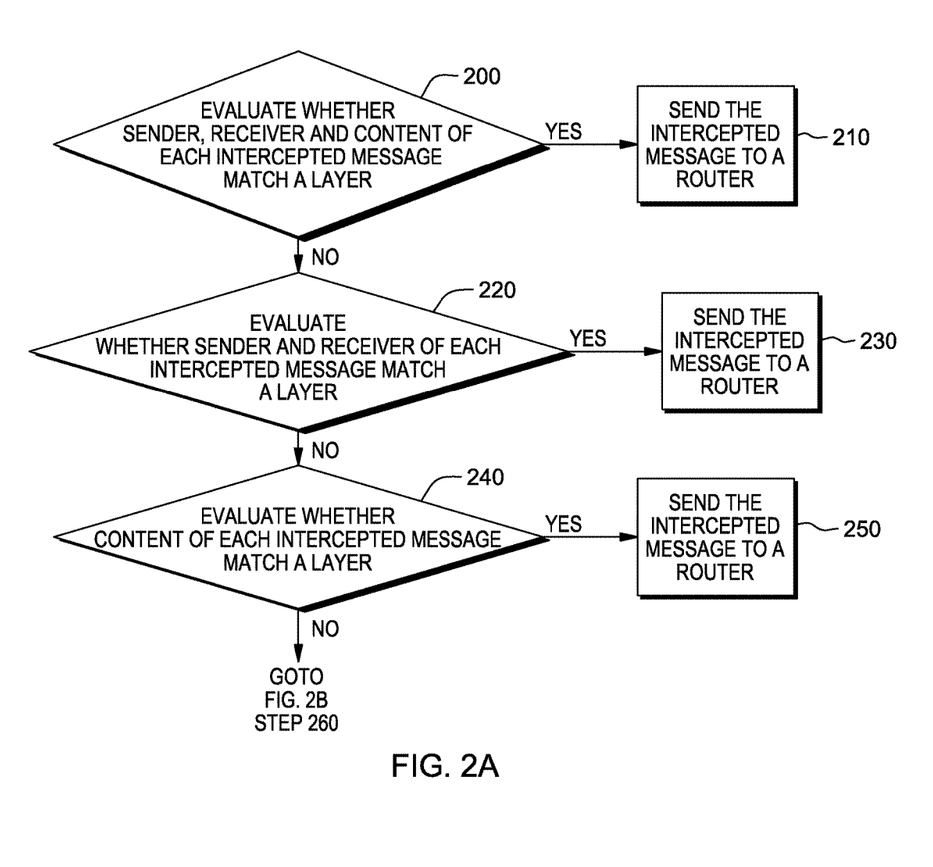
FIGS. 2A-2B illustrate a flowchart that describes method steps for classifying each intercepted message in one embodiment.
Figure 2B:
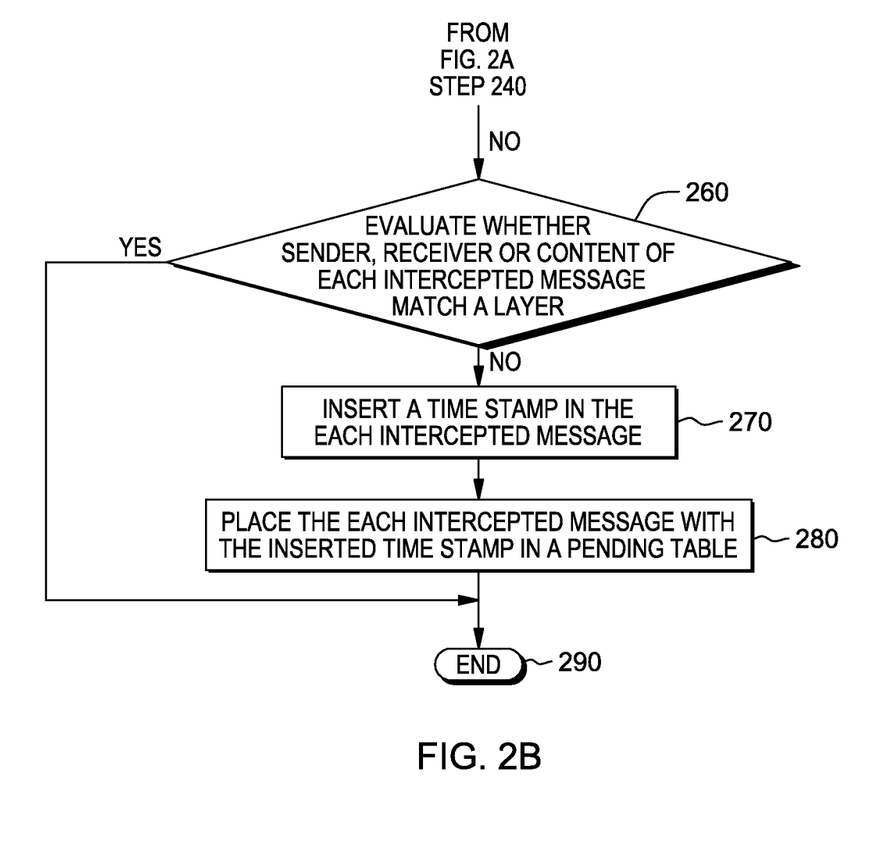

Upon intercepting the one or more messages, the classifier determines a sender, a receiver and/or content of each intercepted message, e.g., based on header information of the one or more messages. FIGS. 2A-2B illustrate a flowchart that describes a method for classifying a message. At 200, the classifier evaluates whether the sender, the receiver and the content of the each message match a layer which includes an identification (e.g., an IP (Internet Protocol) address) of the sender, an identification of the receiver, and a keyword of the content. In this embodiment, there exists a plurality of pre-determined message groups (e.g., a message group for the coldStart trap, etc.). Each layer represents a message group. Each message group may include one or more pre-determined keywords, e.g., "warmStart," "configuration," etc. Each layer may have one or more storage devices, which store a list of senders' IP addresses and a list of recipients' IP addresses and the pre-determined keywords. The classifier compares an IP address of the sender to IP addresses listed on the senders' IP address list of each layer. At the same time, the classifier compares an IP address of the recipient to IP addresses listed on the recipients' IP address list of each layer. At the same time, the classifier compares keywords of the message, which are obtained by running the content analysis tool, to the pre-determined keywords of each layer. In other words, the classifier runs all the three comparisons concurrently. Alternatively, the classifier runs the three comparisons sequentially.

Figure 9:
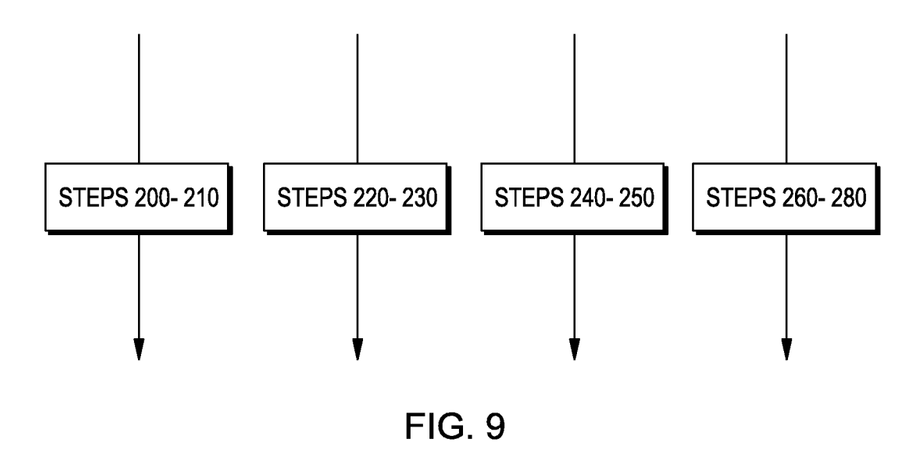
FIG. 9 illustrates that a classifier runs method steps shown in FIGS. 2A-2B concurrently in one embodiment.

At 210, if the sender, the receiver and the content of the intercepted message match a layer whose senders' IP address list includes the identification of the sender, whose recipients' IP address list includes the identification of the receiver and whose pre-determined keywords include one or more of keywords of the intercepted message, the classifier sends the intercepted message to a router (e.g., a router 635 shown in FIG. 5) that forwards the intercepted message to a discovery system of a network domain that corresponds to the matched layer. Otherwise, the control goes to step 220. In one embodiment, the classifier runs steps 220-230 and step 200-210 concurrently as shown in FIG. 9. In another embodiment, the classifier runs steps 200-230 sequentially.

At 220, the classifier evaluates whether the sender and the receiver of the intercepted message match a layer which includes the identification of the sender and the identification of the receiver. For example, the classifier compares the IP address of the sender to IP addresses listed on the senders' IP address list of each layer. At the same, the classifier compares an IP address of the recipient to IP addresses listed on the recipients' IP address list of each layer. In other words, the classifier runs these two comparisons concurrently. Alternatively, the classifier runs these two comparisons sequentially.

At 230, if the classifier determines that the sender and the receiver of the intercepted message match a layer whose senders' IP address list includes the identification of the sender, whose recipients' IP address list includes the identification of the receiver, the classifier sends the intercepted message to a router that forwards the intercepted message to a discovery system of a network domain that corresponds to the matched layer. Otherwise, the control goes to step 240. In one embodiment, the classifier runs steps 200-210, steps 220-230, and 240-250 concurrently as shown in FIG. 9. In another embodiment, the classifier runs steps 200-250 sequentially.

At 240, the classifier evaluates whether the content of the intercepted message matches a layer which includes a keyword of the content. For example, the classifier compares keywords of the message, which are obtained by running the content analysis tool, to the pre-determined keywords of each layer. At 250, if the content of the intercepted message matches a layer whose pre-determined keywords include one or more of keywords of the intercepted message, the classifier sends the intercepted message to a router (e.g., a router 635 shown in FIG. 5) that forwards the each message to a discovery system of a network domain that corresponds to the matched layer. Otherwise, the control goes to step 260. In one embodiment, the classifier runs steps 200-210, steps 220-230, 240-250, and 260-280 concurrently as shown in FIG. 9. In another embodiment, the classifier runs steps 200-280 sequentially.

At 260, the classifier evaluates whether the sender, the receiver or the content of the intercepted message match a layer which includes an identification of the sender, an identification of the receiver, or a keyword of the content. The classifier compares an IP address of the sender to IP addresses listed on the senders' IP address list of each layer. At the same, the classifier compares an IP address of the recipient to IP addresses listed on the recipients' IP address list of each layer. At the same time, the classifier compares keywords of the message, which are obtained by running the content analysis tool, to the pre-determined keywords of each layer. In other words, the classifier runs all the three comparisons concurrently. Alternatively, the classifier runs the three comparisons sequentially.

At 270, if the classifier determines that the sender, the receiver or the content of the intercepted message does not match any layer, i.e., there is no match between the IP address of the sender of the message and an IP address listed on the senders' IP address list of each layer, there is no match between the IP address of the recipient of the message and an IP address listed on the recipients' IP address list of each layer, and there is no match between one of the keywords of the message and a keyword among the pre-determined keywords of each layer, then the classifier inserts a time stamp, which indicate a time period taken to process the intercepted message by the classifier, into the intercepted message. Otherwise, the control goes to step 290 in order for the classifier to end the process shown in FIGS. 2A-2B. At 280, after inserting the time stamp into the intercepted message, the classifier places the intercepted message with the inserted time stamp in a pending table (not shown). At 290, the classifier ends the process shown in FIGS. 2A-2B.

Figure 4:
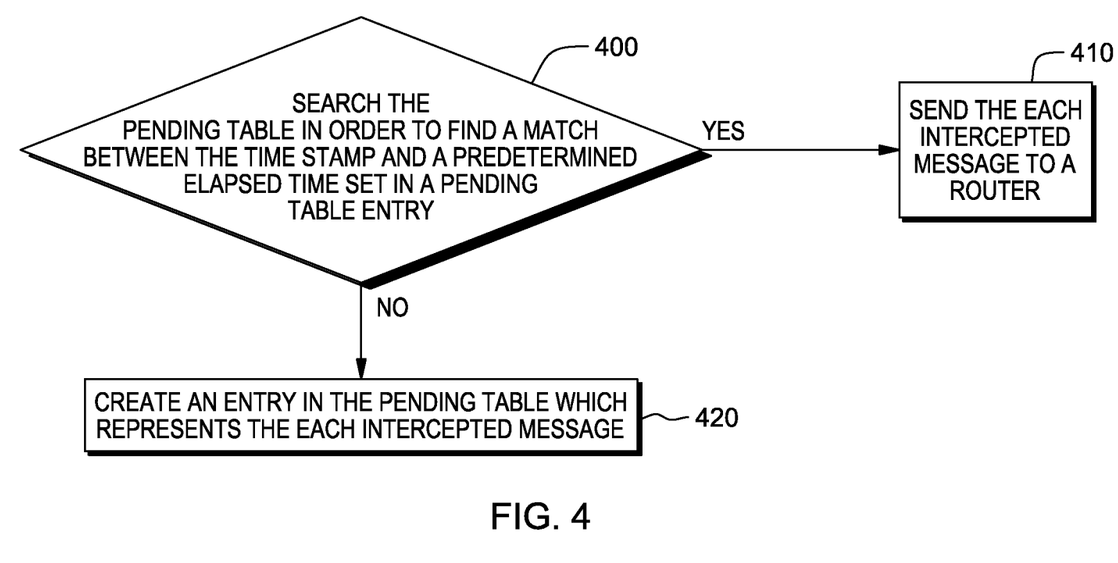
FIG. 4 illustrates a flowchart that describes method steps for scanning a pending table in one embodiment.

FIG. 4 illustrates a flowchart that describes method steps for utilizing the pending table in order to process the intercepted message. The pending table may include a plurality of table entries, each of which includes one or more pre-determined elapsed time (i.e., pre-determined processing time that is used to process a corresponding message by the classifier). At 400, the classifier searches the pending table in order to find a match between the inserted time stamp and a pre-determined elapsed time set in a pending table entry. At 410, upon finding the match, the classifier sends the intercepted message to a router that forwards the intercepted message to a network domain that corresponds to the found match. At 420, upon finding no match, the classifier creates a table entry, in the pending table, which represents the intercepted message and then deletes the intercepted message. The created table entry may include the inserted time stamp of the intercepted message.

The router sends the intercepted message to a network domain which corresponds to the found match at 410 in FIG. 4, the matched layer at 200 in FIG. 2, the matched layer at 220 in FIG. 2, the matched layer at 240 in FIG. 2 or the matched layer at 260. At 420 in FIG. 4, if the classifier finds no match at 410 in FIG. 4, at 200 in FIG. 2, at 220 in FIG. 2, at 240 in FIG. 2 and at 260 in FIG. 2, the classifier sends the intercepted message to all network domains known to the classifier. In one embodiment, all the network domains known to the classifier include, but are not limited to: (1) all the IP addresses listed on senders' IP address lists of all the layers; (2) all the IP addresses listed on receivers' IP address lists of all the layers, etc.

Each network domain may include one or more discovery systems (e.g., a discovery system 640 shown in FIGS. 5-7). A discovery system receives a classified message(s) (i.e., the one or more messages classified by the classifier) and detects, based on the classified message, a new network device added to the one or more networks and detects one or more configuration changes made on the one or more network devices. In order to detect the new network device and to detect the configuration changes made on the one or more network devices, the discovery system performs method steps shown in FIG. 8. At 910, the discovery system parses the received classified message. The discovery system may run a content analysis (e.g., by using a known text mining technique) over the received classified message. At 920, the discovery system fits, based on the parsing, the received classified message to a message group (e.g., a result 830 shown in FIG. 7) among a plurality of message groups.

The plurality of message groups include, but are not limited to: (1) a message group associated with messages for adding the new network device into the one or more networks; (2) a message group associated with messages for modifying configurations of the one or more network devices; and (3) a message group associated with messages for adding a new service(s) to the one or more network devices, e.g., by installing new software applications on the one or more network devices, etc. The discovery system may create a new entity (e.g., creates a virtual machine on the one or more network devices) or modify an existing network device based on one or more message group(s) to which the received classified message fits.

A verifier (e.g., a verifier 645 shown in FIGS. 5-7) evaluates an accuracy of content of the received classified message and/or an accuracy of the message group to which the classified message fits. In one embodiment, in order to evaluate these accuracies, the verifier may query the one or more network devices (e.g., send a verification query to the one or more network device as shown in 625 in FIGS. 5-7). In another embodiment, the verifier sends a media query to the one or more network devices. The verifier uses the media query and/or the verification query in order to find capabilities of the one or more network devices. The verifier may also query a datastore (e.g., a database used for managing the one or more network devices), e.g., by using SQL or like database access tools. Based on answers to the queries received from the one or more network devices and/or the datastore, the verifier may determine that a new configuration or a new service is enabled on the one or more network devices. For example, in a communication network, the EMS may issue the one or more messages, which initiate configuration changes on the one or more network devices, to the one or more network devices. Then, the EMS issues a commit command (i.e., a command that finalizes all the changes made by the one or more messages) to the one or more network devices. If the one or more network devices fails to run the commit command, the one or more network devices do not echo back (i.e., send) a response to the EMS. Upon receiving no echoed response from the one or more network devices during a pre-determined time period (e.g., 1 hour, etc.), the verifier may determine that no corresponding configuration change has been made on the one or more network devices.

In another embodiment, in order to evaluate these accuracies, the verifier may query configuration files of the one or more network devices. The configuration files of the one or more network devices may include a current hardware or software setting(s) of the one or more network devices in machine readable code. In a further embodiment, by analyzing the configuration files accessed via the querying, the verifier may determine that a new configuration or a new service is enabled on the one or more network devices. For example, the configuration files may include machine readable code that indicates the new configuration or the new service. In order to identify that machine readable code that indicates the new configuration and the new service, the verifier runs a known text mining technique over the configuration files, e.g., in order to identify a new IP address added to the configuration files. The new IP address may indicate that a corresponding new network device is added to the one or more networks. In order to identify the new IP address, the verifier may retrieve a previous configuration file(s), which is(are) stored in a database associated with the one or more network devices. Then, the verifier may also access a current configuration file(s) of the one or more network devices which are included in the message intercepted by the classifier. The verifier may compare the current configuration files and the previous configuration files in order to identify the difference between them. The difference may include the new IP address corresponding to the addition of the new network device. In this embodiment, the verifier obviates querying the one or more network devices. The verifier uses the database and the message intercepted by the classifier. In one embodiment, there exists one or more verifiers in a network domain, e.g., a root IP address. There may exist one verifier to one discovery system. If the verifier verifies the accuracies, e.g., by querying the configuration files, the EMS may register the new network device and/or store updated data that reflect the changes made on the one or more network devices.

One or more datastores (e.g., a datastore 650 shown in FIGS. 5-7) store the one or more messages, which are intercepted by the classifier, according to corresponding message groups. The verifiers and the discovery systems in different network domains may share the one or more datastores. The datastores may also be accessible to a correlation engine (e.g., a correlation engine 655 shown in FIG. 5). The correlation engine determines a relationship between the one or more messages, e.g., based on messages groups to which the one or more messages fit or based on header information of the one or more messages. The correlation engine creates, based on the determined relationship, a network topology graph of the one or more network devices and of the one or more networks. For example, the classifier intercepts a first message and a second message both of which come from a same sender, goes to a same recipient. The correlation engine may assume that there exist one or more network communication paths between the sender and the receiver. The correlation engine may further assume that there exist a network device corresponding to the sender and another network device corresponding to the recipient. The discovery system may compare header information of the first message and header information of the second message. The difference between these two header information may indicate that a new intermediate mail server is added during a time period between the inserted time stamp of the first message and the inserted time stamp of the second message. In one embodiment, there exist(s) one or more correlation engine(s) per a network domain.

In one embodiment, a discovery of a new network device and/or configuration changes made on existing network device(s) is run, e.g., by a discovery system (i.e., a system running method steps shown in FIG. 8) as a job during off hours (e.g., computing resources in a corresponding company are not used). Alternatively, the discovery of the new network device and the configuration changes are performed, e.g., by the discovery system, in real-time as the new network device is added to a corresponding network(s) and/or as the configuration changes are made on one or more existing network device(s). The discovery system may run the discovery daily, weekly, and sometimes monthly.

In one embodiment, the discovery system frequently evaluates current status of one or more network devices, e.g., by using an ICMP (Internet Control Management Protocol) echo request(s) (for example, a ping command used to test a direct or indirect connection to a computer), a SNMP (Simple Network Management Protocol) message—a message used to manage network devices under a known network protocol, or parsing a file on the Element Management System. The discovery system may gather the frequent evaluations of the one or more network device and investigate these evaluations. The investigation of these evaluations include, but are not limited to: (1) a data analysis (e.g. by using a known data mining technique, etc.) over information that the discovery system gains of the network devices; (2) accessing MIBs (Management Information Bases)—database used for managing network devices in communication networks; and (3) analyzing of configuration files of the network devices, etc. Through the investigation of those evaluations, the discovery system may gather information, in a fast (e.g., within 1 sec, etc.) and a complete way, about the network devices, network connections or paths that the network devices use, and services provided from the network devices in a particular network domain. The discovery system starts the discovery (of the new network device and/or the configuration changes), e.g., based on one or more events that the discovery system receives from one or more network devices. The received events include, but are not limited to: (1) the coldStart trap described above; (2) the warmStart trap described above; (3) a message associated with a creation of a virtual machine; and (4) accessing (e.g., opening, etc.) a file(s) by the one or more network devices. The discovery system discovers the new network device and/or the configuration changes made on existing network device, e.g., through one or more of the received events. For example, the coldStart trap from a network device may indicate in a machine readable form (e.g., binary code, etc.) that configuration(s) of the network device are altered, e.g., by a user or a computing system. Upon receiving the coldStart trap from that network device, the discovery system detects that there exists one or more configuration changes made on the network device, e.g., by processing the machine readable form by one or more controllers or processors.

In one embodiment, the new network device does not perform anything in order to assist or perform the discovery the new network device. The system 600 shown in FIG. 5, 700 shown in FIG. 6 or 800 shown in FIG. 7 performs the discovery of the new network device without accessing the new network device, e.g., by running method steps shown in FIGS. 1, 2A-2B, 4 and 8.

In one embodiment, a computing system may run the method illustrated in FIGS. 1-2B. FIG. 3 illustrates examples of the computing system. Examples of the computing system may include, but are not limited to: a parallel computing system 300 including at least one processor 355 and at least one memory device 370, a mainframe computer 305 including at least one processor 356 and at least one memory device 371, a desktop computer 310 including at least one processor 357 and at least one memory device 372, a workstation 315 including at least one processor 358 and at least one memory device 373, a tablet computer 320 including at least one processor 356 and at least one memory device 374, a netbook computer 325 including at least one processor 360 and at least one memory device 375, a smartphone 330 including at least one processor 361 and at least one memory device 376, a laptop computer 335 including at least one processor 362 and at least one memory device 377, a physical server 340 including at least one processor 361 and at least one memory device 378, a software server 380, e.g., web server, HTTP server, application server, or a wearable computer 385, e.g., smartwatch, etc., including at least one processor 390 and at least one memory device 395.

In one embodiment, the methods shown in FIGS. 1-2B may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIG. 1-2B may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A computer-implemented apparatus for managing one or more network devices in one or more networks, comprising:
   a memory device storing program instructions; and
   two or more processors coupled with the memory device, a first processor of the two or more processors configured to run the program instructions to perform:
   intercept at least one message;
   parse the intercepted at least one message;
   determine, based on a result of parsing the intercepted at least one message: a network domain where the intercepted at least one message is processed; and determine at least one network device of the one or more network devices with which the intercepted at least one message is associated;
   send the intercepted at least one message to one or more second processors at the network domain determined based on the intercepted at least one message, the one or more second processors being included in the two or more processors and configured to;
   parse the intercepted at least one message sent from the first processor;
   determine, based on a result of parsing the intercepted at least one message sent from the first processor, the intercepted at least one message as corresponding to one of a plurality of message groups, the plurality of message groups including: a message group associated with messages for adding a new entity to the one or more networks; and a message group associated with messages for changing a configuration of the at least one network device;
   add the new entity to the one or more networks or change the configuration of the at least one network device based on the determined message group to which the intercepted at least one message corresponds;
   generate and send a query signal to the at least one network device; and
   evaluate an accuracy of the determined message group based on a response to the query signal received from the at least one network device by performing at least:
      retrieving a previous configuration information stored in a database associated with the at least one network device using the query signal;
      comparing a current configuration information in the intercepted at least one message with the retrieved previous configuration information;
      determining that the new entity is added to the one or more networks based on a comparison result of the current configuration information and the retrieved previous configuration information,
      wherein the comparison result includes identifying a new IP address added to the current configuration information; and
      determining that the changing of the configuration is made on the at least one network device based on the comparison result of the current configuration information and the retrieved previous configuration information.

2. The apparatus according to claim 1, wherein the at least one network device includes one or more of: a server device connected to the one or more networks; a virtual machine running on the server device; a data storage device connected to the server device; and one or more communication paths in the one or more networks.

3. The apparatus according to claim 2, wherein the data storage device stores the at least one message according to corresponding message groups.

4. The apparatus according to claim 1, wherein the intercepted at least one message includes:
   one or more configuration message associated with the at least one network device;
   one or more configuration files associated with the at least one network device;
   one or more messages that indicates a creation of one or more virtual machines on the at least one network device;
   a trap message that reinitializes the at least one network device and notifies whether the configuration of the at least one network device is altered or not;
   log files echoed from the at least one network device; and
   service catalogs associated with the at least one network device.

5. The apparatus according to claim 1, wherein the first processor is further configured to:
   identify one or more layers of:
   a layer corresponding to an operating system of the at least one network device;
   a layer corresponding to a physical link in the one or more networks; and
   a layer corresponding to each of the one or more networks.

6. The apparatus according to claim 5, wherein to determine the network domain and the at least one network device message, the first processor is further configured to:
   determine a sender, a receiver and a content of the intercepted at least one message.

7. The apparatus according to claim 6, wherein to determine the network domain and the at least one network device, the first processor is further configured to:
   evaluate whether each of the sender, the receiver and the content of the at least one message matches with a corresponding one of a sender's identification (ID) of a senders' address list, a receiver's ID of a receivers' address list, and a keyword of one or more predetermined keywords, wherein the senders' address list, the receivers' address list, and the one or more predetermined keywords are stored in one or more storage devices; and
   upon determining that each of the sender, the receiver and the content of the at least one message matches with the corresponding one of the sender's ID, the receiver's ID, the keyword of the one or more predetermined keywords, send the at least one message to the second processor at the network domain.

8. The apparatus according to claim 6, wherein to determine the network domain and the at least one network device, the first processor is further configured to:
   evaluate whether each of the sender and the receiver of the at least one message matches with a corresponding one of a sender's identification (ID) of a senders' address list and a receiver's ID of a receivers' address list, wherein the senders' address list and the receivers' address list are stored in one or more storage devices; and
   upon determining that each of the sender and the receiver of the at least one message matches with the corresponding one of the sender's ID and the receiver's ID, send the at least one message to the second processor at the network domain.

9. The apparatus according to claim 6, wherein to determine the network domain and the at least one network device, the first processor is further configured to:
   evaluate whether each of the content of the at least one message matches with a keyword of the one or more predetermined keywords stored in one or more storage devices; and
   upon determining that the content of the at least one message matches with the keyword of the one or more predetermined keywords, send the at least one message to the second processor at the network domain.

10. The apparatus according to claim 6, wherein to determine the network domain and the at least one network device, the first processor is further configured to:
    evaluate whether each of the sender, the receiver or the content of the at least one message matches with a corresponding one of a sender's identification (ID) of a senders' address list, a receiver's ID of a receivers' address list, or a keyword of one or more predetermined keywords;
    upon determining that there is no layer including a sender's identification (ID) of a senders' address list, a receiver's ID of a receivers' address list, and a keyword of one or more predetermined keywords, each of which is matched with a corresponding one of the sender, the receiver and the content of the at least one message, insert a time stamp, which indicates a time period taken to process the at least one message by the first processor, into the at least one message; and
    place the at least one message with the inserted time stamp in a pending table.

11. The apparatus according to claim 10, wherein to determine the network domain and the at least one network device, the first processor is further configured to:
    search the pending table in order to find a match between the time stamp and a pre-determined elapsed time set in a pending table entry;
    upon finding the match, send the at least one message to a router that forwards the at least one message to the network domain that corresponds to the found match; and
    upon finding no match, create an entry, in the pending table, which represents the at least one message and delete the at least one message.

12. The apparatus according to claim 1, wherein a third processor of the two or more processors is further configured to:
    determine a relationship between the at least one message including a first message and a second message both indicating a same sender and a same receiver and having different header information; and
    create, based on the determined relationship, a network topology graph of the at least one network device and of the one or more networks.

13. The apparatus according to claim 1, wherein the plurality of message groups further includes a message group associated with messages for adding a new service to the at least one network device, and
    wherein the adding a new service includes installing a new software application, and the adding the new entity to the one or more network devices includes creating a virtual machine on the at least one network device.

14. The apparatus according to claim 1, wherein the one or more second processors are further configured to:
    determine that the changing of the configuration of the at least one network is not made on the at least one network device, upon receiving no echoed response from the at least one network device during a predetermined time period.

15. A method for managing one or more network devices in one or more networks, the method comprising:
    exchanging, by a first processor, at least one message between the at least one network device;
    intercepting, by the first processor, the at least one message;
    parsing, by the first processor, the intercepted at least one message;
    determining, by the first processor, based on a result of parsing the intercepted at least one message: a network domain where the intercepted at least one message is processed; and determining at least one network device of the one or more network devices with which the intercepted at least one message is associated;
    sending, by the first processor, the intercepted at least one message to one or more second processors at the network domain determined based on the intercepted at least one message;
    parsing, by the one or more second processors, the intercepted at least one message sent from the first processor;
    determining, by the one or more second processors, based on a result of parsing the intercepted at least one message sent from the first processor, the intercepted at least one message as corresponding to one of a plurality of message groups, the plurality of message groups including: a message group associated with messages for adding a new entity to the one or more networks; and a message group associated with messages for changing a configuration of the at least one network device;
    adding, by the one or more second processors, the new entity to the one or more networks or changing the configuration of the at least one network device based on the determined message group to which the intercepted at least one message corresponds;
    generating and sending, by the one or more second processors, a query signal to the at least one network device; and
    evaluating, by the one or more second processors, an accuracy of the determined message group based on a response to the query signal received from the at least one network device by performing at least:
    retrieving a previous configuration information stored in a database associated with the at least one network device using the query signal;
    comparing a current configuration information in the intercepted at least one message with the retrieved previous configuration information;
    determining that the new entity is added to the one or more networks based on a comparison result of the current configuration information and the retrieved previous configuration information, wherein the comparison result includes identifying a new IP address added to the current configuration information; and
    determining that the changing of the configuration is made on the at least one network device, based on the comparison result of the current configuration information with the retrieved previous configuration information.

16. The method according to claim 15, wherein the intercepted at least one message includes: one or more configuration message associated with the at least one network device; one or more configuration files associated with the at least one network device; one or more messages that indicates a creation of one or more virtual machines on the at least one network device; a trap message that reinitializes the at least one network device and notifies whether the configuration of the at least one network device is altered or not; log files echoed from the at least one network device; and service catalogs associated with the at least one network device.

17. The method according to claim 15, wherein the plurality of message groups further includes a message group associated with messages for adding a new service to the at least one network device, and
wherein the adding a new service includes installing a new software application, and the adding the new entity to the one or more network devices includes creating a virtual machine on the at least one network device.

18. A computer program product for managing one or more network devices, the computer program product comprising a computer readable non-transitory storage medium, the computer readable storage medium readable by two or more processors and storing instructions run by the two or more processors for performing a method, said method comprising
exchanging by a first processor of the two or more processors, at least one message between the at least one network device;
intercepting, by the first processor, the at least one message;
parsing, by the first processor, the intercepted at least one message;
determining, by the first processor, based on a result of parsing the intercepted at least one message: a network domain where the intercepted at least one message is processed; and
determining at least one network device of the one or more network devices with which the intercepted at least one message is associated;
sending, by the first processor, the intercepted at least one message to one or more second processors of the two or more processors at the network domain determined based on the intercepted at least one message;
parsing, by the one or more second processors, the intercepted at least one message sent from the first processor;
determining, by the one or more second processors, based on a result of parsing the intercepted at least one message sent from the first processor, the intercepted at least one message as corresponding to one of a plurality of message groups, the plurality of message groups including: a message group associated with messages for adding a new entity to the one or more networks; and a message group associated with messages for changing a configuration of the at least one network device;
adding, by the one or more second processors, the new entity to the one or more networks or changing the configuration of the at least one network device based on the determined message group to which the intercepted at least one message corresponds;
generating and sending, by the one or more second processors, a query signal to the at least one network device; and
evaluating, by the one or more second processors, an accuracy of the determined message group based on a response to the query signal received from the at least one network device by performing at least:
retrieving a previous configuration information stored in a database associated with the at least one network device using the query signal;
comparing a current configuration information in the intercepted at least one message with the retrieved previous configuration information;
determining that the new entity is added to the one or more networks based on a comparison result of the current configuration information and the retrieved previous configuration information, wherein the comparison result includes identifying a new IP address added to the current configuration information; and
determining that the changing of the configuration is made on the at least one network device based on the comparison result of the current configuration information and the retrieved previous configuration information.

19. The computer program product according to claim 18, wherein the plurality of message groups further includes a message group associated with messages for adding a new service to the at least one network device, and
wherein the adding a new service includes installing a new software application, and the adding the new entity to the one or more network devices includes creating a virtual machine on the at least one network device.

* * * * *